United States Patent
Huo et al.

(10) Patent No.: US 8,453,211 B2
(45) Date of Patent: May 28, 2013

(54) METHOD OF OBTAINING PROXY CALL SESSION CONTROL FUNCTION ADDRESS WHILE ROAMING

(75) Inventors: Yuzhen Huo, Guangdong Province (CN); Yangwei Tu, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 12/740,045

(22) PCT Filed: Jun. 16, 2008

(86) PCT No.: PCT/CN2008/071326
§ 371 (c)(1),
(2), (4) Date: Apr. 27, 2010

(87) PCT Pub. No.: WO2009/056010
PCT Pub. Date: May 7, 2009

(65) Prior Publication Data
US 2010/0263026 A1    Oct. 14, 2010

(30) Foreign Application Priority Data
Nov. 1, 2007  (CN) .......................... 2007 1 0168086

(51) Int. Cl.
*H04L 29/00* (2006.01)
(52) U.S. Cl.
USPC ........ 726/4; 726/5; 726/6; 713/155; 713/156; 713/157; 713/158; 713/159; 713/189; 713/190; 713/191; 713/192; 713/193; 713/194
(58) Field of Classification Search
USPC ................... 713/155–159, 189–194; 726/4–6
See application file for complete search history.

(56) References Cited

U.S. PATENT DOCUMENTS

| | | | |
|---|---|---|---|
| 2005/0086541 A1* | 4/2005 | Rajaniemi | 713/202 |
| 2006/0077932 A1* | 4/2006 | Takeda et al. | 370/331 |
| 2008/0155659 A1* | 6/2008 | Gazier et al. | 726/4 |
| 2010/0169950 A1* | 7/2010 | Matti et al. | 726/1 |

FOREIGN PATENT DOCUMENTS

| | | |
|---|---|---|
| CN | 1553741 A | 12/2004 |
| CN | 1878103 A | 12/2006 |
| CN | 101047725 A | 10/2007 |
| WO | 02102107 A1 | 12/2002 |

OTHER PUBLICATIONS

International Search Report for PCT/CN2008/071326 dated Aug. 1, 2008.

* cited by examiner

*Primary Examiner* — Ghazal Shehni
(74) *Attorney, Agent, or Firm* — Banner & Witcoff, Ltd.

(57) ABSTRACT

The present invention provides a method for obtaining a proxy call session control function address, comprising when a terminal accesses an IP multi-media subsystem through a world interoperability for microwave access (WiMAX) network in roaming scenarios, a visited authentication, authorization, and accounting server (V-AAA) of the terminal retransmitting an access request message sent by an access service network (ASN) or a dynamic host configuration protocol (DHCP) or a home agent (HA) of said terminal to a home authentication, authorization, and accounting server (H-AAA) of said terminal after receiving the access request message, and H-AAA finally deciding whether the P-CSCF is located in a visited network or a home network according to a roaming protocol and visited network capability, and returning the determined P-CSCF address information, included by H-AAA in an access accept message corresponding to said access request message, to the sender of said access request message through V-AAA.

21 Claims, 9 Drawing Sheets

METHOD OF OBTAINING PROXY CALL SESSION CONTROL FUNCTION ADDRESS WHILE ROAMING

TECHNICAL FIELD

The present invention relates to a method for obtaining a proxy call session control function (P-CSCF) address of an access point of multimedia subsystem (IMS) when a subscriber accessing an internet protocol (IP) IMS through world interoperability for microwave access (WiMAX) network roams.

BACKGROUND OF THE RELATED ART

Figure 1:
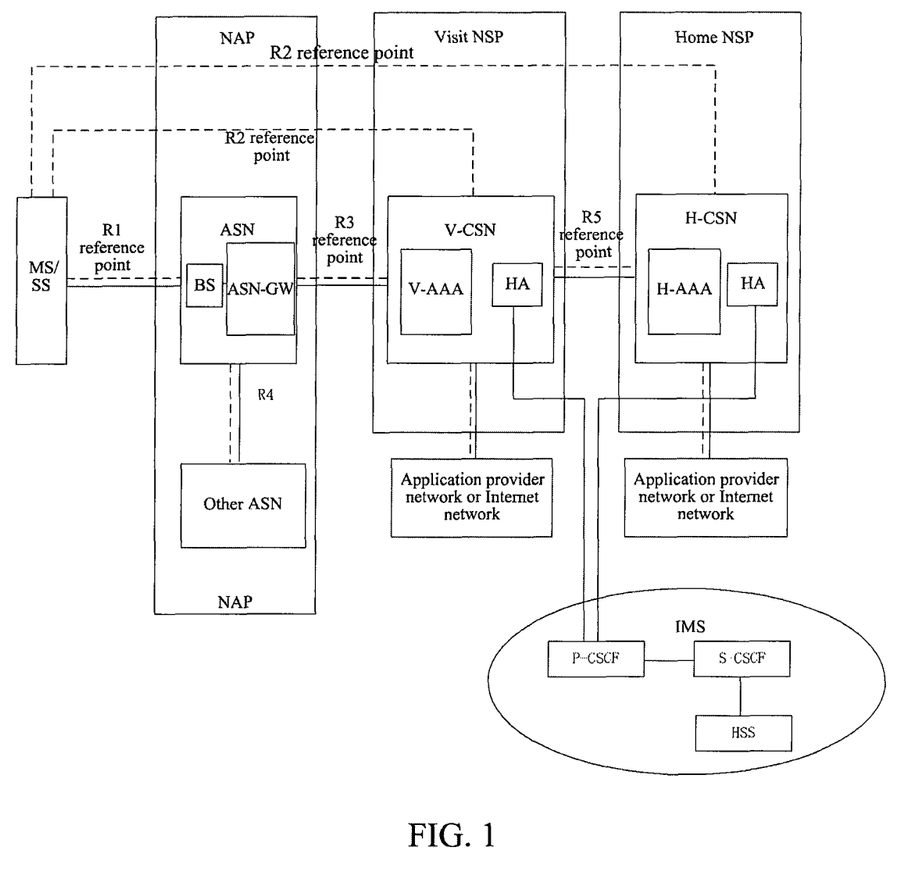
FIG. 1 is a schematic drawing illustrating a reference model of the network architecture of intercommunication between WiMAX network and IMS network.

WiMAX is a broadband wireless access technology based on standards of IEEE (Institute of Electrical and Electronics Engineers) 802.16, which can effectively utilize limited wireless spectrum resources to provide a relatively wide air-interface bandwidth (with the maximum data transmission capacity of 70 Mbps). As shown in FIG. 1, the network reference model of WiMAX is made up of three logic entities: a mobile station/stationary station (MS/SS), an access service network (ASN) and a connection service network (CSN), wherein each of them represents a group of functional entities, and each functional entity may be implemented in a single physical device or in multiple physical devices. ASN mainly provides WiMAX subscribers with corresponding wireless access and control. CSN provides MS with IP connection service. When the subscriber roams, CSN is divided into a visited CSN (V-CSN) and a home CSN (H-CSN). In FIG. 1, R1 is a reference point between MS and ASN, R2 is a logic reference point, and R3 is a reference point between ASN and CSN. Dotted lines represent control signaling.

A home network service provider (Home NSP, H-NSP for short) is a local network service provider. H-NSP, being an operator or a business group, has service level agreement associated with WiMAX subscribers, authenticates and authorizes sessions of subscribers (within network or in roaming scenarios), and charging subscribers' service (charging and providing bills). For the purpose of supporting roaming service, a H-NSP may have roaming agreements with other NSP. A H-NSP network is made up of H-CSN (home connection service network), mainly including a home authentication, authorization and accounting server storing subscriber's subscription service and home agent (HA) network elements.

A visited network service provider (Visited NSP, V-NSP for short) is defined in the view of roaming subscribers, and roaming subscribers use the wireless coverage of V-NSP to access WiMAX service. V-NSP may have a roaming protocol with H-NSP of subscribers, and provides H-AAA service routing to H-NSP. Based on the WiMAX service request of subscribers and the protocol between H-NSP and V-NSP, V-NSP can provide roaming subscribers with some or all of the WiMAX services, or provide H-NSP with data/control service routing. V-NSP network mainly comprises a visited authentication, authorization and accounting server (V-AAA), which provides proxy forwarding function, and home agent (HA) network elements.

A network access provider (NAP) is a business unit providing WiMAX wireless access architecture for one or more WiMAX NSPs. NAP includes one or more ASNs, mainly comprising base station (BS) and access gateway (ASN-GW).

Foreign agent (FA) is a functional entity in ASN-GW, providing the foreign agent function for a mobile IP terminal.

Home agent (HA) is a function entity of CSN, providing home agent function for the mobile IP terminal. HA may be located in H-CSN, or in V-CSN.

WiMAX network needs to adopt mobile IP as a mobility management protocol. In mobile IP framework, mobile IP client maintains fixed home network IP address among different FAs. The mobile IP protocol provides IP routing service to public IP networks for mobile subscribers. The mobility management of WiMAX network supports two different MIP (mobile IP) protocols: client mobile IP (CMIP) and proxy mobile IP (PMIP). According to MIP protocols, in CMIP application, terminals can negotiate with network about packaging broadcast/multicast messages and use a reverse tunnel to send these messages to HA for processing.

A dynamic host configuration protocol proxy (DHCP Proxy) may be a functional entity of ASN-GW, providing DHCP proxy function for mobile IP terminals.

A dynamic host configuration protocol relay (DHCP Relay) may be a functional entity of ASN-GW, providing DHCP relay function for mobile IP terminals.

A domain name server (DNS) is deployed by operators, responsible for maintaining the binding relation between domain names and IP addresses.

Since the connection service network of WiMAX only provides the connection of IP layers, the service control function is not defined, and can't provide controllable telecommunication service, so it needs to be implemented with other mature networks. IMS is the first choice for network architecture of the next generation IP service and is the overall architecture of the future network, whose scheme architecture enhances the IP stream-based controllability and manageability, representing the development trend of the future network. Therefore, WiMAX access will constitute an important IP access network of IMS network, being able to supplement the limited bandwidth defect of other wireless access technologies.

The network architecture of the intercommunication between WiMAX network and IMS network is shown in FIG. 1. Call session control function (CSCF) is the core network element of IMS, and may be divided into proxy call session control function (P-CSCF), inquiry call session control function (I-CSCF), and service call session control function (S-CSCF). A home subscriber server (HSS) manages and processes subscriber's subscription data intensively in IMS system. P-CSCF is the first entrance point for the subscriber to access IMS network, and can select a subscriber home network. WiMAX subscribers are required to access P-CSCF through WiMAX network to access IMS network and enjoy IMS services.

Since P-CSCF is the first entrance point for the subscriber to access IMS network, the P-CSCF address needs to be obtained at first when the subscriber needs to access IMS through WiMAX system.

P-CSCF may be located in the home network, or in the visited network. In the prior art, there is no corresponding solution about how to obtain the address of P-CSCF of IMS network's access point, and how to determine whether the access point P-CSCF is located in the visited network or home network according to the related information when the subscriber roams.

CONTENT OF THE INVENTION

The technical problem to be solved in the present invention is to provide a method for acquiring a proxy call session control function (P-CSCF) address during roaming, providing a solution for determining the location of P-CSCF in roaming scenarios, and for exchanging P-CSCF address information between the home network and the visited network.

To solve the technical problems described above, the present invention provides a method for obtaining a P-CSCF address during roaming, comprising: when a terminal accesses an IP multi-media subsystem (IMS) through a world interoperability for microwave access (WiMAX) network in a roaming scenario, a visited authentication, authorization, and accounting server (V-AAA) of said terminal retransmitting an access request message sent by an access service network (ASN) or a dynamic host configuration protocol (DHCP) or a home agent (HA) of said terminal to a home authentication, authorization, and accounting server (H-AAA) of said terminal after receiving the access request message; and said H-AAA determining whether the P-CSCF is located in a visited network or a home network according to a roaming protocol and visited network capability, and returning the determined P-CSCF address information, which is included by said H-AAA in an access admission message corresponding to said access request message, to the sender of said access request message through said V-AAA.

Further, said V-AAA carries the visited network capability information in said access request message retransmitted to said H-AAA, wherein, if the visited network of said terminal has capability of allocating P-CSCF address, said V-AAA carries the P-CSCF address information in said access request message retransmitted to said H-AAA; and if the visited network of said terminal has capability of the DHCP server, said V-AAA carries DHCP server address information in said access request message retransmitted to said H-AAA.

Further, in an initial access authentication process of said terminal, said ASN sends said access request message to said H-AAA, said H-AAA determines that said ASN is a DHCP proxy or a DHCP relay based on the roaming protocol.

Further, in a mobile IP registration process or a DHCP process of said terminal, said HA sends an access request message to said H-AAA, and said H-AAA determines that said HA is a DHCP proxy or a DHCP relay based on the roaming protocol.

Further, if said H-AAA determines that said ASN or said HA is the DHCP proxy, the H-AAA returns the determined P-CSCF address information, which is included in said access admission message by the H-AAA, to said DHCP proxy through said V-AAA, and said DHCP proxy saves said P-CSCF address information; in the DHCP process, said DHCP proxy sends said P-CSCF address information to said terminal in a DHCP confirmation message.

Further, if said H-AAA determines that said ASN or said HA is the DHCP relay, said access admission message returned by said H-AAA to said V-AAA includes the DHCP server address information, and said DHCP relay obtains the DHCP server address information; in the DHCP process, said DHCP relay retransmits a DHCP notification message to said DHCP server after receiving the DHCP notification message from the terminal, and said DHCP server sends the P-CSCF address information to said terminal through said DHCP relay.

Further, said H-AAA returning a message which includes said DHCP server address information of said visited network to said V-AAA; or said H-AAA returning a message which includes said DHCP server address information of said home network to said V-AAA.

Further, said DHCP server acquiring the P-CSCF address information by interacting with said V-AAA using an authentication, authorization and accounting (AAA) protocol, or by interacting with a network management system using a network management protocol, or by configuring statically.

Further, after receiving said DHCP notification message, said DHCP server sending an access request message to said V-AAA.

Further, when said HA is the DHCP relay, said HA acquires the DHCP server address information by interacting with said V-AAA using the AAA protocol, or by interacting with the network management system using the network management protocol, or by configuring statically.

Further, after said H-AAA determines whether said P-CSCF is located in the visited network or in the home network according to the roaming protocol and the visited network capability, the method further comprising the following steps of:

not that said H-AAA not returns any said P-CSCF address information to said V-AAA in said access admission message, but that said V-AAA designates said P-CSCF address information and includes said P-CSCF address information in said access admission message; or said H-AAA including said P-CSCF address information of said visited network in said access admission message and returning said P-CSCF address information of said visited network to said V-AAA; or said H-AAA returning said P-CSCF address information of said home network to said V-AAA.

Further, if said terminal is a CMIP terminal, and a reverse tunnel is not adopted, said ASN is used as the DHCP proxy; if said terminal is the CMIP terminal, and the reverse tunnel is adopted, said HA is used as the DHCP proxy.

Further, if said terminal is the CMIP terminal, and the reverse tunnel is not adopted, said ASN is used as the DHCP relay; if said terminal is the CMIP terminal, and the reverse tunnel is adopted, said HA is used as the DHCP relay.

Further, said P-CSCF address information comprises: a P-CSCF IP address, or a P-CSCF domain name and DNS address; if said P-CSCF address information is the P-CSCF domain name and DNS address, said terminal uses the P-CSCF domain name to inquire the P-CSCF IP address of the DNS.

The present invention solves the problem of determining whether P-CSCF is located in the visited network or home network in roaming scenarios, and the problem of exchanging P-CSCF address information between the home network and the visited network, enabling the subscriber terminal to obtain P-CSCF address information while roaming.

PREFERRED EMBODIMENTS OF THE PRESENT INVENTION

The present invention provides a method for acquiring P-CSCF address by roaming subscribers, providing a solution for determining the location of P-CSCF in roaming scenarios, and for exchanging P-CSCF address information between the home network and the visited network.

The main idea of the present invention is: V-AAA and H-AAA negotiating whether to have the home network or visited network provide needed address information of service network for terminals, the address information being DHCP server address, or P-CSCF address information. When receiving an access request message from ASN-GW/HA, V-AAA sending the access request message, which carries visited network capability information, to H-AAA. If deciding to use ASN-GW or HA as a DHCP proxy according to a roaming protocol and the visited network capability information, H-AAA returning the P-CSCF address information to ASN-GW or HA; if determining to use ASN-GW or HA as a DHCP relay, H-AAA returning the DHCP server address to ASN-GW or HA; DHCP server further obtaining P-CSCF address information; terminals initiating a DHCP process to obtain P-CSCF address information from ASN-GW or HA, or obtaining P-CSCF address information from DHCP server through ASN-GW or HA.

The implementation of the technical scheme is described in detail in conjunction with the accompanying drawings in the following.

Embodiment 1

Figure 2:
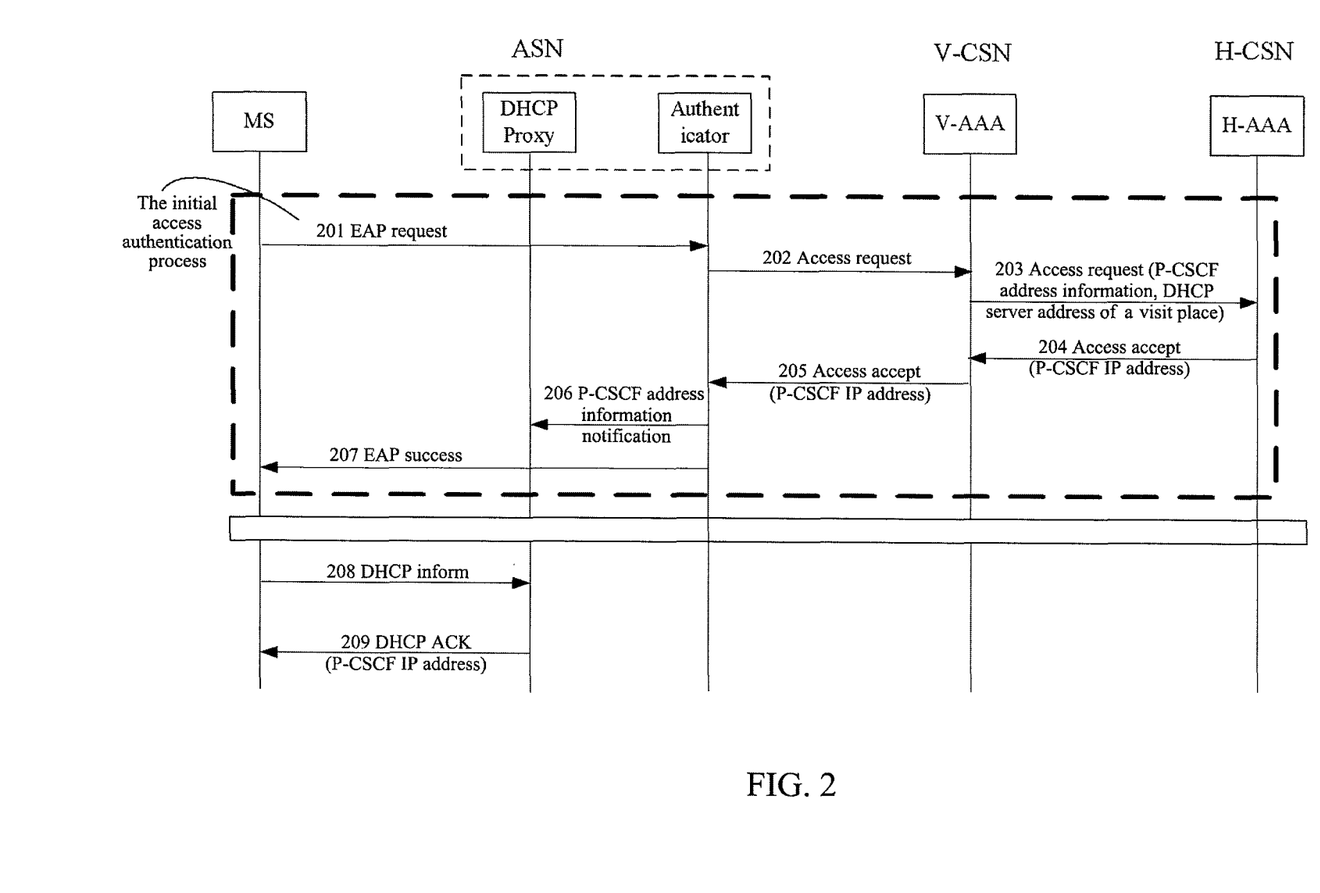
FIG. 2 is a flow chart of finding P-CSCF in the application of using ASN-GW as a DHCP proxy according to the present invention.

FIG. 2 is a flow chart of finding P-CSCF in the application of ASN-GW serving as a DHCP proxy.

Steps 201-207 illustrate the flow of access authentication for a terminal of MS in roaming state. FIG. 2 only shows for simplify an access request message and an access accept message by which V-AAA exchanges P-CSCF address information and the DHCP server address with H-AAA. Other messages not illustrated in the figure are the same as those in the prior art.

Step 201, the terminal initiates an EAP request message through a functional entity authenticator of ASN-GW.

Step 202, the authenticator sends the access request message to V-AAA.

Step 203, V-AAA sends the access request message to H-AAA.

Wherein V-AAA brings visited network information to H-AAA in the access request message, as a reference for H-AAA. If the visited network is capable of allocating the P-CSCF address, the visited network information includes the P-CSCF address information of the visited network; if the visited network has a capability of the DHCP server, the visited network information includes the DHCP server address information of the visited network. In the present embodiment, the visited network doesn't have the capability of the DHCP server.

Step 204, H-AAA determines to use ASN-GW as a DHCP proxy according to the information such as a roaming agreement of V-NSP and H-NSP, and determines whether P-CSCF is located in the visited network or in the home network, and after determining, H-AAA notifies V-AAA of corresponding P-CSCF address information (which is P-CSCF IP address in the present embodiment) in an access accept message.

Wherein H-AAA determines whether to have the home network or have the visited network provide access IMS network services for the terminal, i.e. determines whether P-CSCF is located in the visited network or in the home network according to the content signed in the roaming protocol. Whether P-CSCF can be located in the visited network is signed in the roaming protocol. Furthermore, if supported by the roaming network, the local policy of H-AAA can determine whether or not P-CSCF is in the visited network. In addition, for emergent services, P-CSCF must be in the visited network.

The following cases may exist in the step:

1) not that H-AAA returns any P-CSCF information to V-AAA, but that the P-CSCF address information is designated by the V-AAA directly; or 2) H-AAA returns the P-CSCF address information brought by V-AAA to V-AAA; or 3) H-AAA returns the P-CSCF address information of the home network to V-AAA.

The first two cases are the processing ways when determining that P-CSCF is located in the visited network, and the third case is the processing way when determining that P-CSCF is located in the home network.

Since the visited network doesn't have the capability of a DHCP server in the present embodiment, H-AAA determines to use ASN-GW as a DHCP proxy. If the visited network has the capability of a DHCP server, H-AAA and V-AAA negotiate whether to use ASN-GW as a DHCP proxy or a DHCP relay.

Step 205, V-AAA subsequently returns the P-CSCF IP address returned by H-AAA or designated by V-AAA to the functional entity authenticator of ASN-GW in the access accept message.

Step 206, the functional entity authenticator of ASN-GW notifies DHCP proxy of P-CSCF address information, and DHCP proxy stores the P-CSCF address information (e.g. IP address).

Step 207, the authenticator sends the EAP success message to the terminal. Access authentication is completed.

After access authentication is completed, the terminal may not initiate step 208 at once, but waits till the terminal needs to trigger IMS service.

Step 208, the terminal sends a DHCP Inform message to the DHCP proxy to obtain the P-CSCF address information.

Step 209, the DHCP proxy returns the P-CSCF address information to the terminal in the DHCP ACK message.

Embodiment 2

Figure 3:
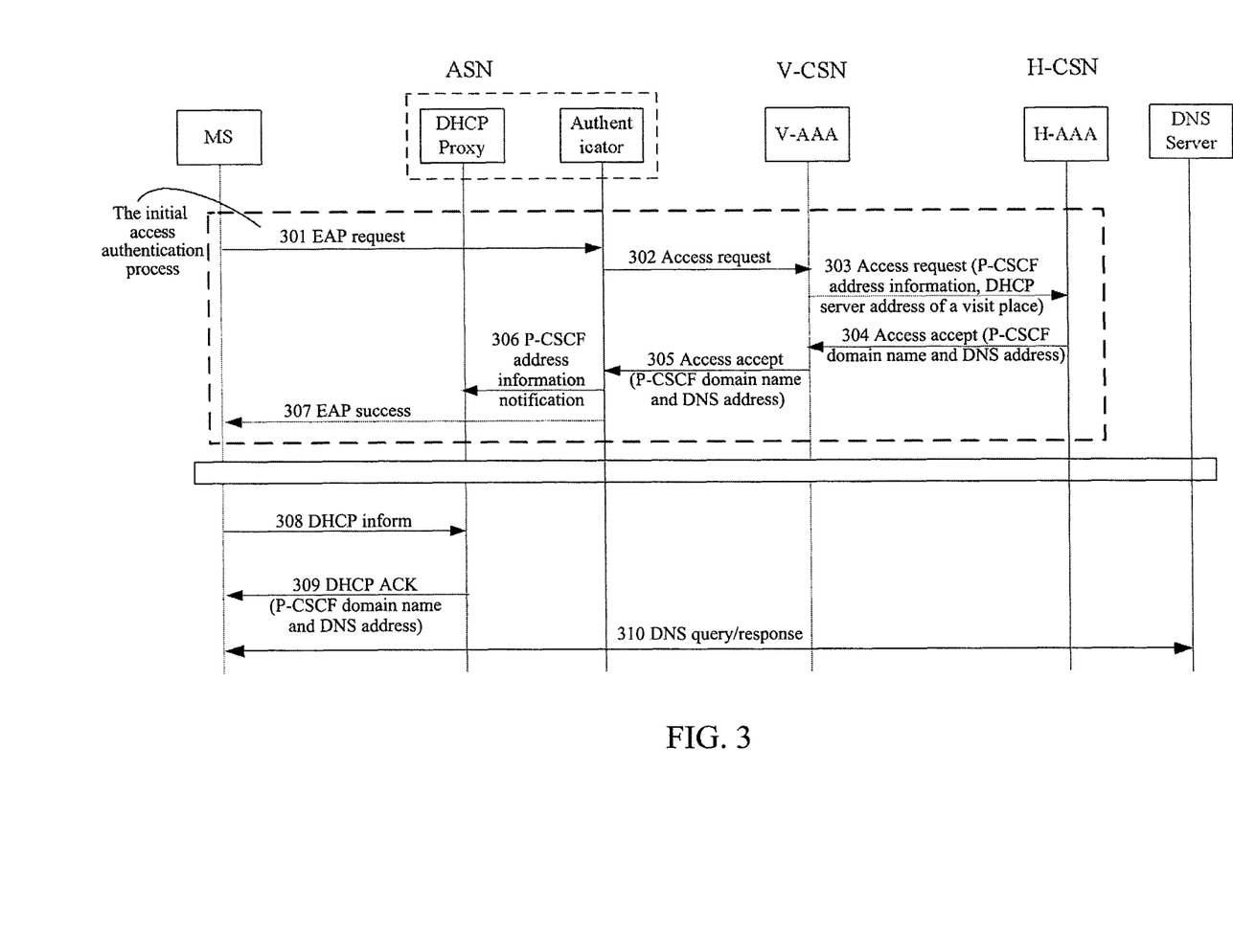
FIG. 3 is a flow chart of finding P-CSCF in the application of using ASN-GW as a DHCP proxy according to the present invention (H-AAA returns P-CSCF domain name and DNS address)

Another embodiment of the present invention is shown in FIG. 3. Steps 301-309 are the same as steps 201-209 except that the P-CSCF address information returned by H-AAA is P-CSCF domain name and DNS address in the present embodiment.

Step 310, since what the terminal obtains is the P-CSCF domain name and DNS address, the terminal is required to acquire the P-CSCF IP address by inquiring of DNS.

Embodiment 3

Figure 4:
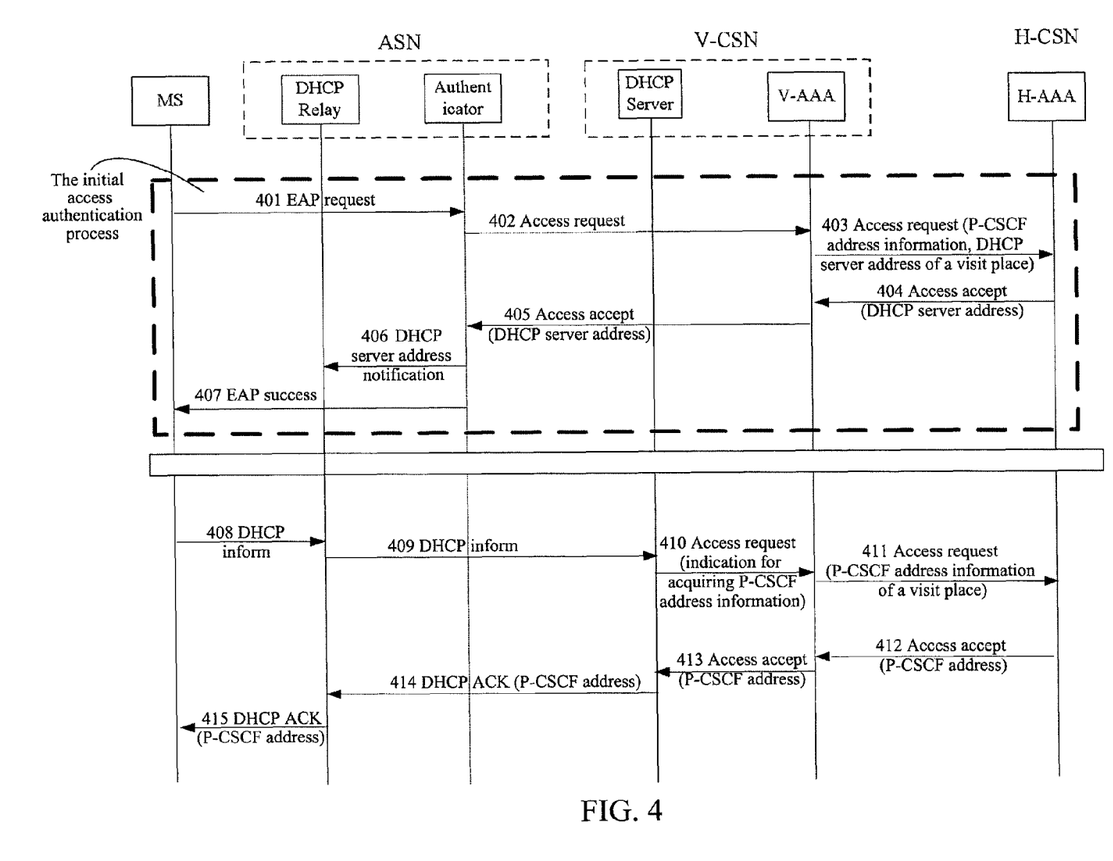
FIG. 4 is a flow chart of finding P-CSCF in the application of using ASN-GW as a DHCP relay according to the present invention.

FIG. 4 is a flow chart of finding P-CSCF in the application of using ASN-GW as a DHCP relay.

Steps 401-407 is the access authentication flow. FIG. 4 only shows for simplify an access request message and an access accept message by which V-AAA exchanges P-CSCF address information and DHCP server address with H-AAA. Other messages not illustrated in the figure are the same as those in the prior art.

Steps 401-402, the terminal sends an access request message to V-AAA through an authenticator.

Step 403, V-AAA sends the access request message to H-AAA.

Wherein V-AAA brings the visited network information to H-AAA in the access request message; if the visited network is capable of allocating the P-CSCF address, the visited network information includes the P-CSCF address information of the visited network; if the visited network has a capability of DHCP server, the visited network information includes the DHCP server address information of the visited network. In the present embodiment, the visited network has the capability of DHCP server, i.e. V-CSN includes DHCP server.

Step 404, H-AAA determines whether to use ASN-GW as a DHCP proxy or a DHCP relay according to the information such as roaming protocol of V-NSP and H-NSP. In the present embodiment, H-AAA determines to use ASN-GW as a DHCP relay according to the information such as roaming protocol of V-NSP and H-NSP, and after determining, H-AAA notifies V-AAA of corresponding DHCP server address in the access ACK message. The following cases may exist.

1) H-AAA doesn't return any DHCP server information to V-AAA, and ASN-GW is used as DHCP proxy; or 2) H-AAA returns the DHCP server address information brought from V-AAA to V-AAA, and ASN-GW is used as a DHCP relay in this case; or 3) H-AAA returns the DHCP server address information of the home network to V-AAA, and ASN-GW is used as a DHCP relay in this case.

In general, DHCP server whose address information is returned above is located in the same network as P-CSCF. When the DHCP server of the home network connects with P-CSCF, P-CSCF is located in the visited network; and when the DHCP server of the visited network connects with P-CSCF, P-CSCF is located in the home network.

Step 405, V-AAA subsequently returns the DHCP server address to the functional entity authenticator of ASN-GW in the access accept message.

Step 406, the functional entity authenticator of ASN-GW notifies the DHCP relay of DHCP server address, and DHCP relay stores the related information.

Step 407, the authenticator sends the EAP success message to the terminal. Access authentication is completed.

After access authentication is completed, the terminal may not initiate step 408 at once, but waits till the terminal needs to trigger IMS service.

Step 408, the terminal sends the DHCP Inform message to the DHCP relay to obtain P-CSCF address information.

Step 409, the DHCP relay sends the DHCP Inform message to the DHCP server.

Step 410, the DHCP server obtains P-CSCF address from V-AAA through the access request message.

Step 411, if the visited network is capable of allocating P-CSCF address, V-AAA may notify H-AAA of the P-CSCF address information of the visited network in the access request message.

Steps 412-413, H-AAA determines whether P-CSCF is located in the visited network or in the home network according to information such as the roaming protocol. After determining, H-AAA notifies V-AAA of corresponding P-CSCF address information (in the present embodiment, the P-CSCF address information is the P-CSCF IP address) in the access accept message. The P-CSCF address information that H-AAA may return is as described in steps 204-205. V-AAA subsequently returns the P-CSCF address information to DHCP server in the access accept message.

Steps 414-415, the DHCP server returns the P-CSCF address information to the DHCP relay in the DHCP ACK message, and DHCP relay sends it to the terminal.

In the steps 412-413, the DHCP server may use AAA protocol to interact with V-AAA, or interact with network management system by using network management protocols, or use static configuration to acquire the P-CSCF address information. The interaction by using Network management protocol is the same as the method described in detail in the present invention, except that the protocols used are different. When using the latter two ways to obtain P-CSCF address information, the access accept message returned to DHCP server by V-AAA may not carry P-CSCF address information. When DHCP server statically configures P-CSCF address information at local network, the data to be configured is determined by operators, and the terminal inquires the DHCP server to obtain P-CSCF address information through the DHCP relay. The present invention focuses on illustrating the way of interaction with V-AAA through AAA protocol using a flow chart, and the other ways are not illustrated.

Embodiment 4

Figure 5:
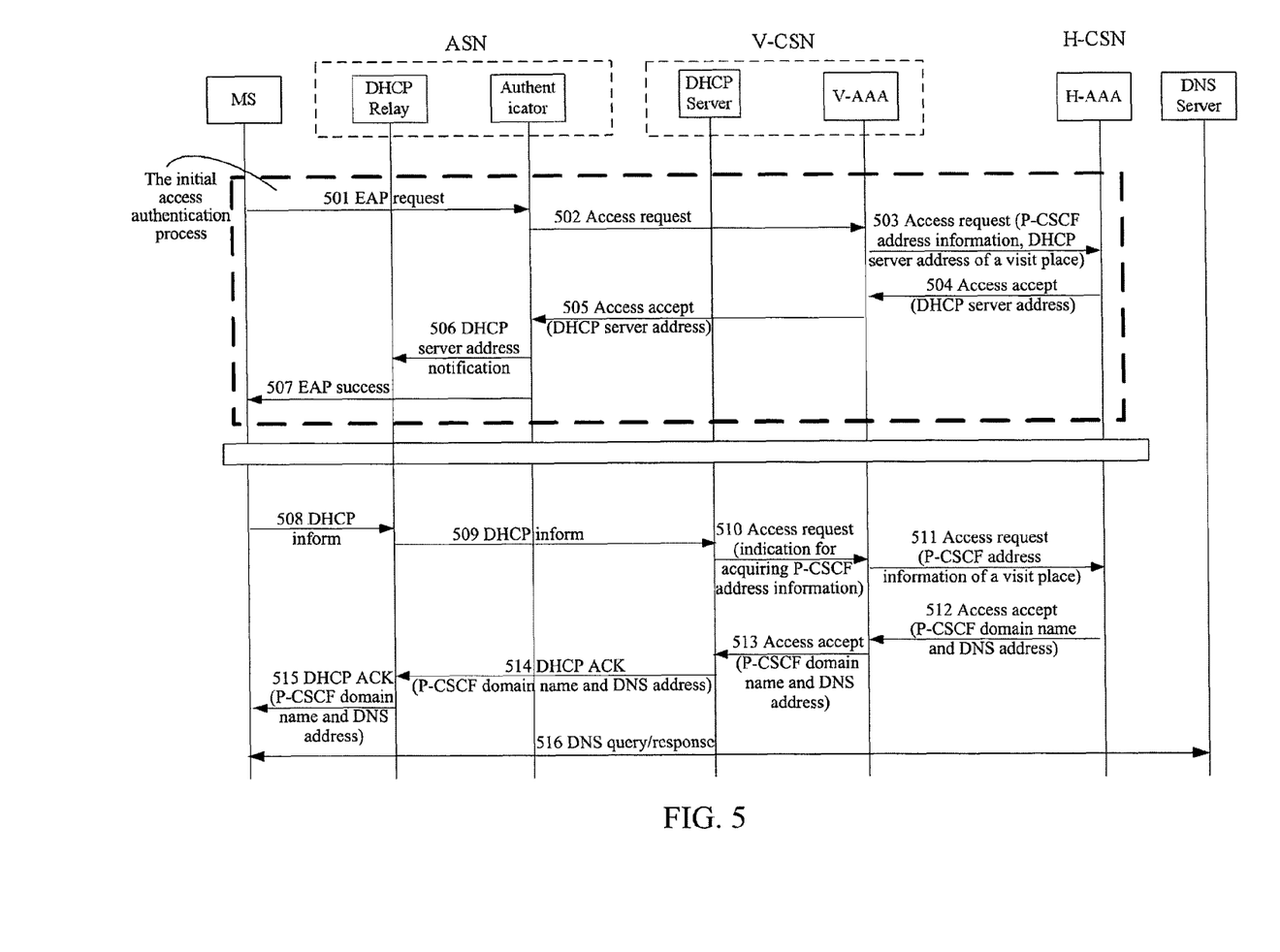
FIG. 5 is a flow chart of finding P-CSCF in the application of using ASN-GW as a DHCP relay according to the present invention (H-AAA returns P-CSCF domain name and DNS address)

Another embodiment of the present invention is shown in FIG. 5, whose steps 501-515 are the same as steps 401-415 except that the P-CSCF address information returned by H-AAA is the P-CSCF domain name and DNS address in the present embodiment.

Step 516, since what the terminal obtains is the P-CSCF domain name and DNS address, the terminal is required to acquire P-CSCF IP address by inquiring of DNS.

Embodiment 5

Figure 6:
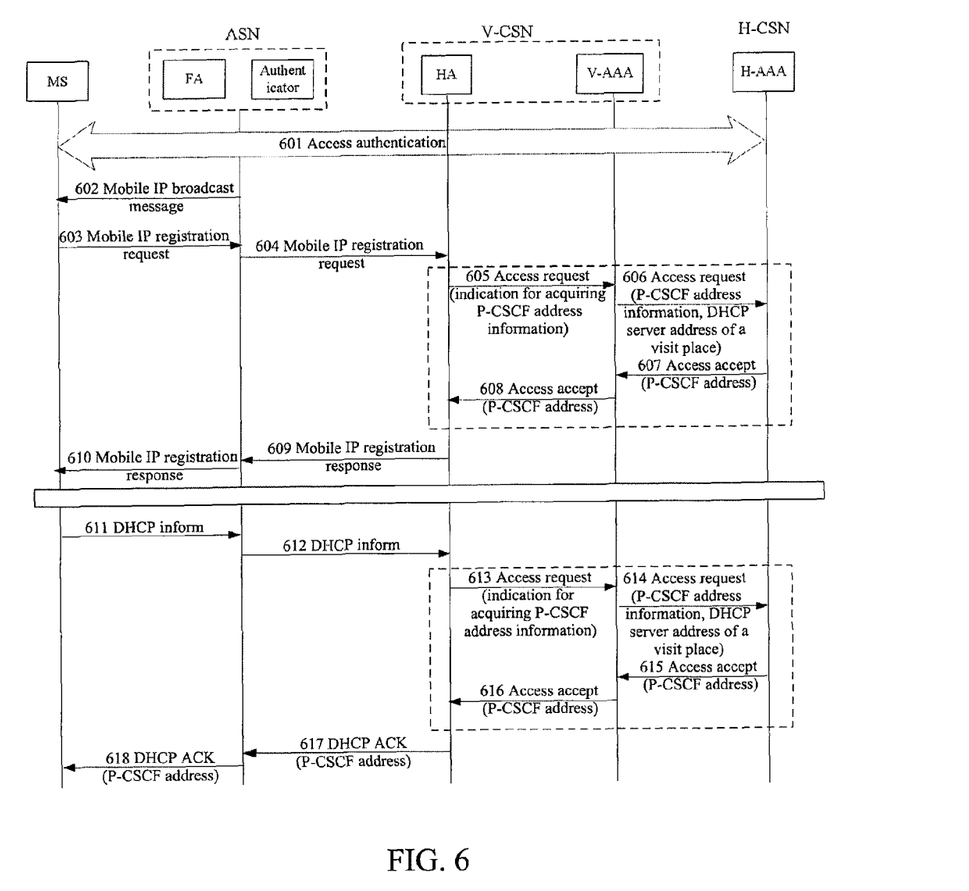
FIG. 6 is a flow chart of finding P-CSCF by using the reverse tunnel and using HA as a DHCP proxy in an application of CMIP according to the present invention.

FIG. 6 is a flow chart of finding P-CSCF by using the reverse tunnel and using HA as a DHCP proxy in CMIP application according to the present invention.

In the prior art, ASN-GW is used as a DHCP proxy or a DHCP relay. In the present invention, the network element being used as a DHCP proxy or a DHCP relay may also select HA, if the reverse tunnel is not used, ASN-GW is adopted, and if the reverse tunnel is used, HA is adopted.

Step 601, the initial access authentication process.

Steps 602-604, after the access authentication is successful, FA sends a mobile IP broadcast message to the terminal, the CMIP terminal sends a mobile IP registration request message to FA, and FA forwards it to HA. According to the existing mobile IP protocols and drafts, the terminal negotiates with FA and HA to determine to use the reverse tunnel to process the DHCP Inform message.

Step 605, HA acquires the P-CSCF address information from V-AAA through the access request message.

Step 606, if the visited network is capable of allocating a P-CSCF address, V-AAA may notify H-AAA of the P-CSCF address information of the visited network in the access request message. If the visited network has the capability of the DHCP server, V-AAA may notify H-AAA of the P-CSCF address information of the visited network in the access request message.

Steps 607-608, H-AAA determines to use HA as a DHCP Proxy and whether P-CSCF is located in the visited network or in the home network. After determining, H-AAA notifies V-AAA of corresponding P-CSCF address information (which is P-CSCF IP address in the present embodiment) in the access accept message. The P-CSCF address information that H-AAA may return is as described in steps 204-205. V-AAA subsequently returns the P-CSCF address information to HA in the access accept message.

In general, HA, DHCP server and P-CSCF are located in the same network. When HA of the visited network connects with P-CSCF, P-CSCF is located in the visited network; when HA of the home network connects with P-CSCF, P-CSCF is located in the home network.

In the steps 607-608, HA may interact with V-AAA by using AAA protocol, or interact with network management system by using network management protocols, or use static configuration to obtain the P-CSCF address information. The present invention focuses on illustrating the way of interaction with V-AAA through AAA protocol using a flow chart, and the other ways are not illustrated. When using the latter two ways to obtain P-CSCF address information, in steps 607-608, the access accept message returned to HA by V-AAA may not carry P-CSCF address information.

Steps 605-608 may be executed at this moment or wait till the terminal initiates a DHCP notification message to obtain the P-CSCF address information.

Steps 609-610, HA sends a mobile IP registration response to the terminal through FA, and mobile IP registration is completed.

After mobile IP registration is completed, the terminal may not initiate step 611 at once, but waits till the terminal needs to trigger IMS service.

Steps 611-612, the terminal sends the DHCP Inform message, then, FA sends the message to HA.

Steps 613-616 are the same as steps 605-608. When HA doesn't execute steps 605-608 to obtain P-CSCF address information in the mobile IP registration process, here, HA executes steps 613-616 to obtain P-CSCF address information.

Step 617-618, as the DHCP proxy, HA returns P-CSCF address information to the terminal in the DHCP ACK message through FA.

Embodiment 6

Figure 7:
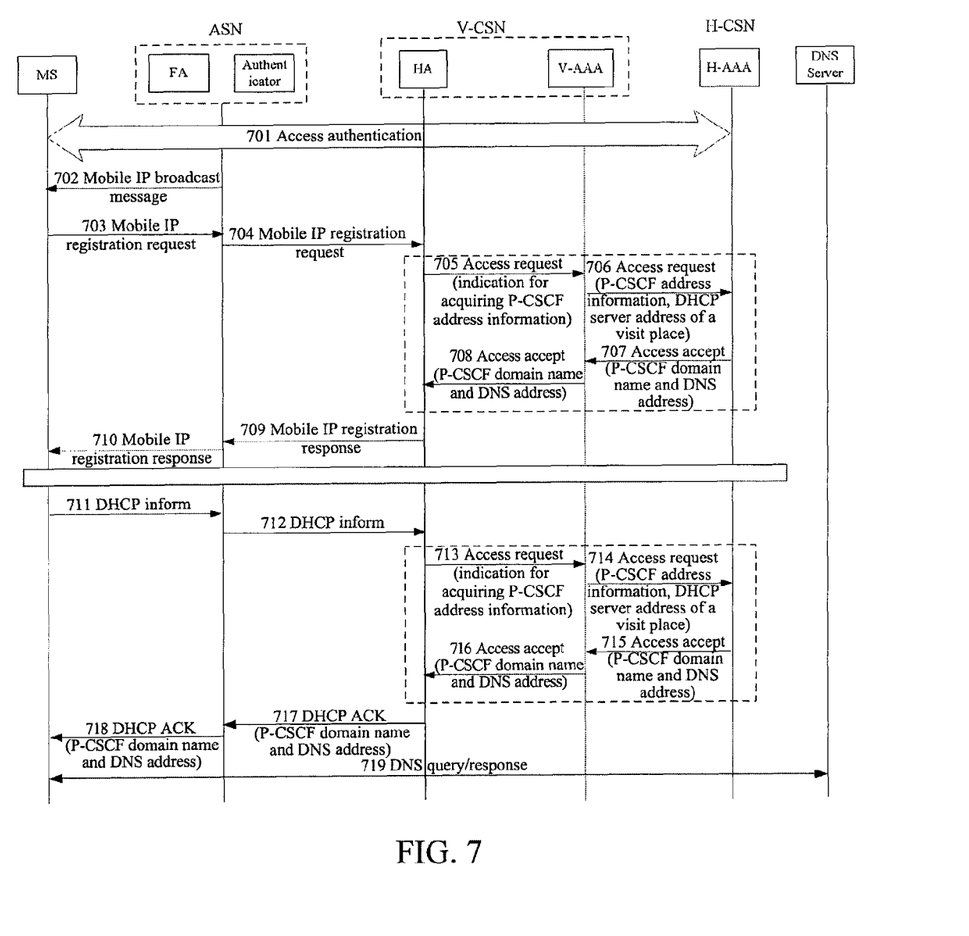
FIG. 7 is a flow chart of finding P-CSCF by using the reverse tunnel and using HA as a DHCP proxy in an application of CMIP according to the present invention (H-AAA returns P-CSCF domain name and DNS address)

Another embodiment of the present invention is shown in FIG. 7. Steps 701-718 are the same as steps 601-618 except that the P-CSCF address information returned by H-AAA is the P-CSCF domain name and DNS address in the present embodiment.

Step 719, since what the terminal obtains is the P-CSCF domain name and DNS address, the terminal is required to acquire P-CSCF IP address by inquiring of DNS.

Embodiment 7

Figure 8:
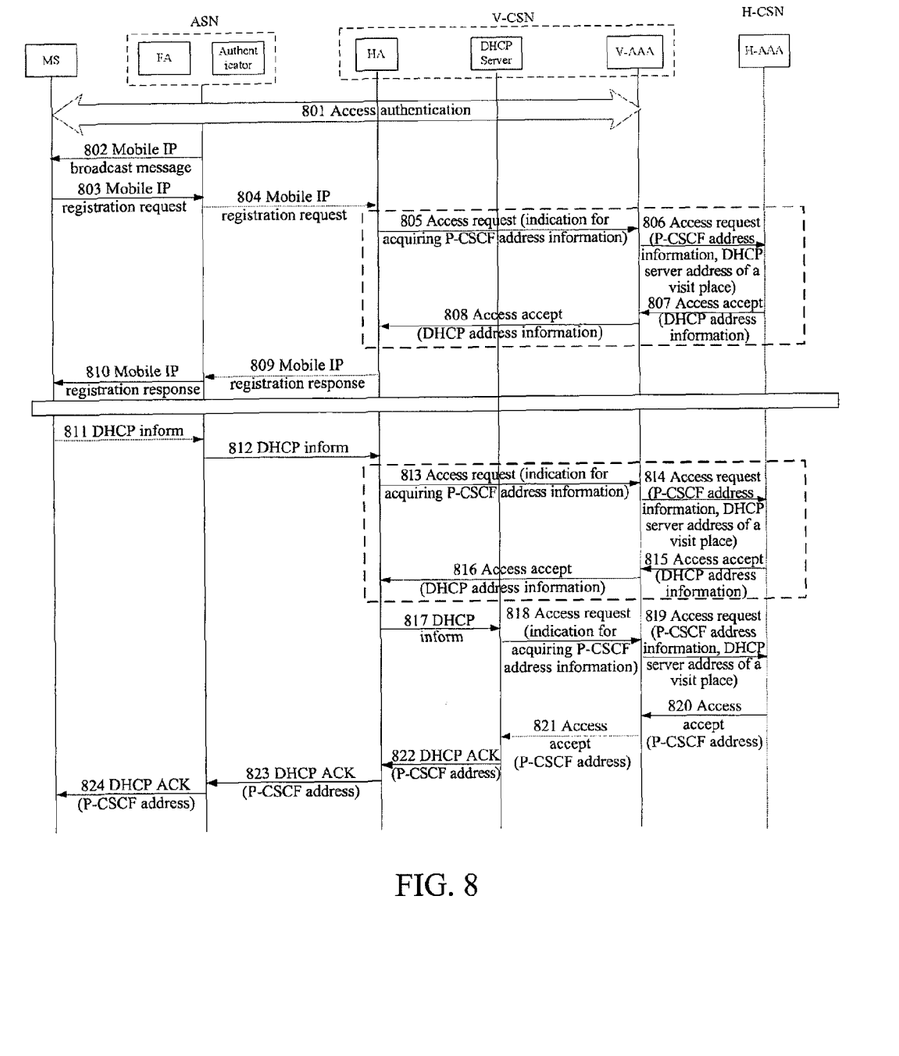
FIG. 8 is a flow chart of finding P-CSCF by using the reverse tunnel and using HA as a DHCP relay in an application of CMIP according to the present invention.

FIG. 8 is a flow chart of finding P-CSCF by using the reverse tunnel and using HA as a DHCP relay in CMIP application according to the present invention.

Steps 801-804 are the same as steps 601-604.

Steps 805-806 are the same as steps 605-606.

Steps 807-808, H-AAA determines to use HA as a DHCP relay according to information such as the roaming protocol of V-NSP and H-NSP. After determining, H-AAA notifies V-AAA of corresponding DHCP server address in the access admission message. The DHCP server address that H-AAA may return is as described in steps 404-405. V-AAA subsequently returns the DHCP server address to HA in the access accept message. In general, HA, DHCP server and P-CSCF are located in the same network.

In the steps 807-808, HA may interact with V-AAA by using AAA protocol, or interact with network management system by using network management protocols, or use HA's own static configuration to acquire the DHCP server address. The present invention focuses on illustrating the way of interaction with V-AAA through AAA protocol using the flow chart, and the other ways are not illustrated. When using the latter two ways to acquire the DHCP server address, in steps 807-808, the access accept message returned to HA by V-AAA may not carry the DHCP server address.

Steps 805-808 may be executed at this moment, or wait till the terminal initiates a DHCP Inform message to obtain the P-CSCF address information.

Steps 809-810, mobile IP registration is completed.

After mobile IP registration is completed, the terminal may not initiate step 811 at once, but waits till the terminal needs to trigger MS service.

Steps 811-812, the terminal sends the DHCP Inform message, then, FA sends the message to HA.

Steps 813-816 are the same as steps 805-808. When HA doesn't execute steps 805-808 to obtain the DHCP server address in the mobile IP registration process, here, HA executes steps 813-816 to acquire the DHCP server address.

Step 817, as DHCP relay, HA retransmits the DHCP Inform message to DHCP server.

Steps 818-821 are the same as steps 410-413.

Step 822, DHCP server returns the P-CSCF address information to HA in a DHCP ACK message.

Steps 823-824, as DHCP relay, HA returns the P-CSCF address information to the terminal in the DHCP ACK message through FA.

Embodiment 8

Figure 9:
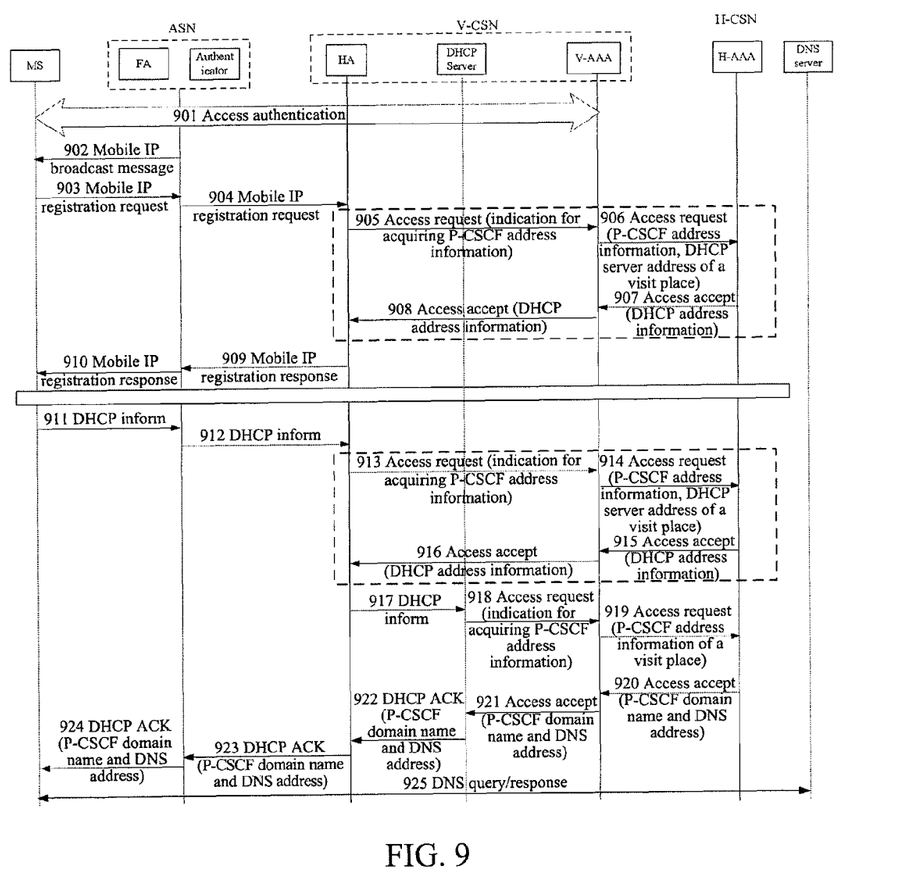
FIG. 9 is a flow chart of finding P-CSCF by using the reverse tunnel and using HA as a DHCP relay in an application of CMIP according to the present invention (H-AAA returns P-CSCF domain name and DNS address).

Another embodiment of the present invention is shown in FIG. 9. Steps 901-924 are the same as steps 801-824 except that the P-CSCF address information returned by H-AAA is the P-CSCF domain name and DNS address in the present embodiment.

Step 925, since what the terminal obtains is the P-CSCF domain name and DNS address, the terminal needs to obtain the P-CSCF IP address through DNS inquiry.

The foregoing description is only embodiments of the present invention. The present invention may have many other embodiments, and without departing from the spirit and essence of the present invention, a person skilled in the art may make various corresponding variations and transformations according to the present invention, but such variations and transformations shall all belong to the protection scope of the appended claims of the present invention.

Industrial Applicability

The present invention solves the problem of how to determine whether P-CSCF is located in the visited network or home network in roaming scenarios according to corresponding information, and the problem of exchanging P-CSCF address information between the home network and the visited network, enabling the subscriber terminal to obtain P-CSCF address information while roaming.

What we claim is:

1. A method for obtaining a proxy call session control function (P-CSCF) address during roaming, comprising:
when a terminal accesses an IP multi-media subsystem (IMS) through a world interoperability for microwave access (WiMAX) network in a roaming scenario, a visited authentication, authorization, and accounting server (V-AAA) of said terminal retransmitting an access request message sent by an access service network (ASN) or a dynamic host configuration protocol (DHCP) server or a home agent (HA) of said terminal to a home authentication, authorization and accounting server (H-AAA) of said terminal after receiving the access request message; and said H-AAA determining whether the P-CSCF is located in a visited network or a home network according to a roaming agreement and visited network capability, and returning the determined P-CSCF address information, which is included by said H-AAA in an access accept message corresponding to said access request message, to the sender of said access request message through said V-AAA.

2. The method of claim 1, wherein, said V-AAA carries the visited network capability information in said access request message retransmitted to said H-AAA;

if the visited network of said terminal has capability of allocating P-CSCF address, said V-AAA carries the P-CSCF address information in said access request message retransmitted to said H-AAA; and if the visited network of said terminal has capability of the DHCP server, said V-AAA carries DHCP server address information in said access request message retransmitted to said H-AAA.

3. The method of claim 2, wherein, in an initial access authentication process of said terminal, said ASN sends said access request message to said H-AAA, and said H-AAA decides that said ASN is a DHCP proxy or a DHCP relay based on the roaming agreement.

4. The method of claim 3, wherein, if said H-AAA determines that said ASN is the DHCP proxy, said H-AAA returns the determined P-CSCF address information, which is included in said access accept message by said H-AAA, to said DHCP proxy through said V-AAA, and said DHCP proxy saves said P-CSCF address information; and in the DHCP process, said DHCP proxy sends said P-CSCF address information to said terminal in a DHCP confirmation message.

5. The method of claim 4, wherein, if said terminal is a client mobile internet protocol (CMIP) terminal, and a reverse tunnel is not adopted, said ASN is used as the DHCP proxy.

6. The method of claim 3, wherein, if said H-AAA determines that said ASN is the DHCP relay, said access accept message returned by said H-AAA to said V-AAA includes the DHCP server address information, and said DHCP relay obtains the DHCP server address information; and in the DHCP process, said DHCP relay retransmits a DHCP notification message to said DHCP server after receiving the DHCP notification message from the terminal, and said DHCP server sends the P-CSCF address information to said terminal through said DHCP relay.

7. The method of claim 6, further comprising:

said H-AAA returning a message which includes said DHCP server address information of said visited network to said V-AAA; or said H-AAA returning a message which includes said DHCP server address information of said home network to said V-AAA.

8. The method of claim 6, further comprising:

said DHCP server acquiring the P-CSCF address information by interacting with said V-AAA using an authentication, authorization and accounting (AAA) protocol, or by interacting with a network management system using a network management protocol, or by configuring statically.

9. The method of claim 6, further comprising:

after receiving said DHCP notification message, said DHCP server sending an access request message to said V-AAA.

10. The method of claim 6, wherein, if said terminal is the a client mobile internet protocol (CMIP) terminal, and a reverse tunnel is not adopted, said ASN is used as the DHCP relay.

11. The method of claim 2, further comprising:

in a mobile IP registration process or a DHCP process of said terminal, said HA sending an access request message to said H-AAA, and said H-AAA deciding that said HA is a DHCP proxy or a DHCP relay based on the roaming agreement.

12. The method of claim 11, wherein, if said H-AAA determines that said HA is the DHCP proxy, said H-AAA returns the determined P-CSCF address information, which is included in said access accept message by said H-AAA, to said DHCP proxy through said V-AAA, and said DHCP proxy saves said P-CSCF address information; and in the DHCP process, said DHCP proxy sends said P-CSCF address information to said terminal in a DHCP ACK message.

13. The method of claim 12, wherein, if said terminal is a client mobile internet protocol (CMIP) terminal, and a reverse tunnel is adopted, said HA is used as the DHCP proxy.

14. The method of claim 11, wherein, if said H-AAA determines that said HA is the DHCP relay, said access accept message returned by said H-AAA to said V-AAA includes the DHCP server address information, and said DHCP relay obtains the DHCP server address information; and in the DHCP process, said DHCP relay retransmits a DHCP Inform message to said DHCP server after receiving the DHCP Inform message from the terminal, and said DHCP server sends the P-CSCF address information to said terminal through said DHCP relay.

15. The method of claim 14, further comprising:

said H-AAA returning a message which includes said DHCP server address information of said visited network to said V-AAA; or said H-AAA returning a message which includes said DHCP server address information of said home network to said V-AAA.

16. The method of claim 14, further comprising:

said DHCP server acquiring the P-CSCF address information by interacting with said V-AAA using an authentication, authorization and accounting (AAA) protocol, or by interacting with a network management system using a network management protocol, or by configuring statically.

17. The method of claim 14, further comprising:

after receiving said DHCP Inform message, said DHCP server sending an access request message to said V-AAA.

18. The method of claim 14, further comprising:

when said HA is the DHCP relay, said HA acquiring the DHCP server address information by interacting with said V-AAA using the AAA protocol, or by interacting with the network management system using the network management protocol, or by configuring statically.

19. The method of claim 14, wherein, if said terminal is a client mobile internet protocol CMIP terminal, and a reverse tunnel is adopted, said HA is used as the DHCP relay.

20. The method of claim 1, wherein, said P-CSCF address information comprises: a P-CSCF IP address, or a P-CSCF domain name and DNS address; and if said P-CSCF address information is the P-CSCF domain name and DNS address, said terminal uses the P-CSCF domain name to inquire the P-CSCF IP address of the DNS.

21. A method for obtaining a proxy call session control function (P-CSCF) address during roaming, comprising:
  when a terminal accesses an IP multi-media subsystem (IMS) through a world interoperability for microwave access (WiMAX) network in a roaming scenario, a visited authentication, authorization, and accounting server (V-AAA) of said terminal retransmitting an access request message sent by an access service network (ASN) or a dynamic host configuration protocol (DHCP) server or a home agent (HA) of said terminal to a home authentication, authorization and accounting server (H-AAA) of said terminal after receiving the access request message;
  said H-AAA determining whether the P-CSCF is located in a visited network or a home network according to a roaming agreement and visited network capability;
  when said H-AAA determines the P-CSCF is located in said visited network, said V-AAA designating P-CSCF address information and including said P-CSCF address information in an access accept message corresponding to said access request message;
  when said H-AAA determines the P-CSCF is located in said home network, or said H-AAA including said P-CSCF address information of said visited network in said access accept message and returning said P-CSCF address information of said visited network to said V-AAA, or said H-AAA returning said P-CSCF address information of said home network to said V-AAA; and
  said V-AAA returning the P-CSCF address information returned by said H-AAA or designated by said V-AAA, to the sender of said access request message.

* * * * *

UNITED STATES PATENT AND TRADEMARK OFFICE
CERTIFICATE OF CORRECTION

PATENT NO.       : 8,453,211 B2                                                           Page 1 of 1
APPLICATION NO.  : 12/740045
DATED            : May 28, 2013
INVENTOR(S)      : Huo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this
Eighth Day of September, 2015

Michelle K. Lee
*Director of the United States Patent and Trademark Office*